(12) United States Patent
Golle et al.

(10) Patent No.: US 7,690,049 B2
(45) Date of Patent: Apr. 6, 2010

(54) EL POWER UNIT

(75) Inventors: John Golle, Eden Prairie, MN (US); Aaron Golle, Shakopee, MN (US)

(73) Assignee: Safe Lites, LLC, Eden Prairie, MN (US)

( * ) Notice: Subject to any disclaimer, the term of this patent is extended or adjusted under 35 U.S.C. 154(b) by 636 days.

(21) Appl. No.: 11/275,504

(22) Filed: Jan. 10, 2006

(65) Prior Publication Data

US 2006/0168705 A1    Aug. 3, 2006

Related U.S. Application Data

(63) Continuation-in-part of application No. 10/707,146, filed on Nov. 24, 2003, now abandoned, which is a continuation-in-part of application No. 10/328,762, filed on Dec. 23, 2002, now Pat. No. 6,769,138.

(51) Int. Cl.
   *A41D 13/00* (2006.01)
(52) U.S. Cl. ............................... 2/69; 362/84
(58) Field of Classification Search ............ 2/102, 2/94, 69, 93, 108, 85; 362/103, 108, 84, 362/189
   See application file for complete search history.

(56) References Cited

U.S. PATENT DOCUMENTS

| | | | |
|---|---|---|---|
| 4,328,533 A | 5/1982 | Paredes | |
| 4,839,777 A | 6/1989 | Janko et al. | |
| 5,070,436 A | 12/1991 | Alexander et al. | |
| 5,211,321 A | 5/1993 | Rodriguez | |
| 5,249,106 A | 9/1993 | Barnes et al. | |
| 5,424,922 A | 6/1995 | Wise | |
| 5,479,325 A | 12/1995 | Chien | |
| 5,564,128 A | 10/1996 | Richardson | |
| 5,567,040 A | 10/1996 | Tabanera | |
| 5,570,945 A | 11/1996 | Chien et al. | |

(Continued)

FOREIGN PATENT DOCUMENTS

JP    10-251906    9/1988

(Continued)

OTHER PUBLICATIONS

"U.S. Appl. No. 11/275,518, Notice of Allowance mailed May 5, 2008", NOAR, 10 pgs.

(Continued)

*Primary Examiner*—Tejash Patel
(74) *Attorney, Agent, or Firm*—Schwegman, Lundberg & Woessner, P.A.

(57) ABSTRACT

A safety vest is sized to be worn by a human, wherein the vest has a front and back and left and right sides each having a shoulder portion. An EL strip is provided on each side of the vest extending from the bottom of the vest upwards toward the shoulder portion. A power source is supported by the vest and connected to the EL lamp strips to supply electrical energy to the strips so that they emit EL light, wherein the EL light emitted by the EL strip is a safety yellow color, and wherein other portions of the vest are a safety orange color. Further safety articles of clothing and devices are also described, including a power pack unit.

20 Claims, 10 Drawing Sheets

U.S. PATENT DOCUMENTS

| | | | |
|---|---|---|---|
| 5,570,946 | A | 11/1996 | Chien |
| 5,575,554 | A | 11/1996 | Guritz |
| 5,613,756 | A | 3/1997 | Allen |
| 5,632,549 | A | 5/1997 | Fang |
| 6,085,698 | A | 7/2000 | Klein |
| 6,086,213 | A | 7/2000 | Holce |
| D440,716 | S | 4/2001 | Lesley |
| 6,405,378 | B1 | 6/2002 | Garner |
| 6,565,231 | B1 | 5/2003 | Cok |
| 6,769,138 | B2 | 8/2004 | Golle et al. |
| 6,834,452 | B2 | 12/2004 | Martin et al. |
| 6,845,016 | B2 | 1/2005 | Matsueda |
| 6,856,715 | B1 | 2/2005 | Ebbesen et al. |
| 6,874,904 | B2 | 4/2005 | Hsu |
| 6,906,472 | B2 * | 6/2005 | Wong ............... 315/200 A |
| 7,144,127 | B2 | 12/2006 | Golle et al. |
| 7,147,339 | B2 | 12/2006 | Golle et al. |
| 7,229,183 | B2 | 6/2007 | Golle et al. |
| 7,364,315 | B2 * | 4/2008 | Chien ............... 362/84 |
| 7,422,340 | B2 | 9/2008 | Golle et al. |
| 2001/0004808 | A1 | 6/2001 | Hurwitz |
| 2006/0104043 | A1 | 5/2006 | Golle et al. |
| 2006/0104044 | A1 | 5/2006 | Golle et al. |
| 2006/0104048 | A1 | 5/2006 | Golle et al. |
| 2006/0104049 | A1 | 5/2006 | Golle et al. |
| 2006/0104052 | A1 | 5/2006 | Golle et al. |

FOREIGN PATENT DOCUMENTS

| | | |
|---|---|---|
| JP | 05-264479 | 10/1993 |
| JP | 08-041706 | 2/1996 |
| JP | 10-037007 | 2/1998 |

OTHER PUBLICATIONS

"U.S. Appl. No. 10/328,762 Non Final Office Action mailed Dec. 2, 2003", 7 pgs.

"U.S. Appl. No. 10/328,762 Notice of Allowance mailed Apr. 1, 2004", 6 pgs.

"U.S. Appl. No. 10/328,762 Response filed Mar. 2, 2004 to Non Final Office Action mailed Dec. 2, 2003", 8 pgs.

"U.S. Appl. No. 10/707,146 Non-Final Office Action mailed Nov. 18, 2005", 8 pgs.

"U.S. Appl. No. 11/275,518 non-final office action mailed Jul. 25, 2007", 5 PGS.

"U.S. Appl. No. 11/275,518 Response filed Mar. 5, 2007 final office action mailed Nov. 3, 2006", 5 PGS.

"U.S. Appl. No. 11/275,518 Response filed Apr. 24, 2007 non-final office action mailed Apr. 9, 2007", 7 PGS.

"U.S. Appl. No. 11/275,518 Response filed Aug. 17, 2006 non-final office action mailed Mar. 17, 2006", 7 PGS.

"U.S. Appl. No. 11/275,518 Final Office Action mailed Nov. 3, 2006", 8 pgs.

"U.S. Appl. No. 11/275,518 Non-Final Office Action mailed Mar. 17, 2006", 8 pgs.

"U.S. Appl. No. 11/275,518 Non-Final Office Action mailed Apr. 9, 2007", 8 pgs.

"U.S. Appl. No. 11/275,518 Response to Non-Final Office Action filed Dec. 20, 2007", 18 pgs.

"U.S. Appl. No. 11/275,519 Non-Final Office Action mailed Jun. 13, 2007", 10 pgs.

"U.S. Appl. No. 11/275,520 Notice of allowance mailed Oct. 2, 2006", 4 PGS.

"U.S. Appl. No. 11/275,520 Response filed Sep. 18, 2006 non-final office action mailed Jun. 16, 2006", 10 PGS.

"U.S. Appl. No. 11/275,520 Non-Final Office Action mailed Jun. 16, 2006", 7 pgs.

"U.S. Appl. No. 11/275,521 Amendment under 37 C.F.R. filed Oct. 17, 2006", 8 PGS.

"U.S. Appl. No. 11/275,521 Notice of allowance mailed Sep. 28, 2006", 4 PGS.

"U.S. Appl. No. 11/275,522 final office action mailed Nov. 16, 2006", 8 PGS.

"U.S. Appl. No. 11/275,522 Response filed Nov. 29, 2006 final office action mailed Nov. 16, 2006", 5 PGS.

"U.S. Appl. No. 11/275,522 Response filed Aug. 29, 2006 non-final office action mailed Mar. 16, 2006", 14 PGS.

"U.S. Appl. No. 11/275,522 Non-Final Office Action mailed Mar. 16, 2006", 16 pgs.

"U.S. Appl. No. 11/275,522, Notice of Allowance mailed Jan. 22, 2007", 4 pgs.

"U.S. Appl. No. 11/275,522, Notice of Allowance mailed Dec. 11, 2006", 4 pgs.

"U.S. Appl. No. 11/275,522, Notice of Allowance mailed May 1, 2007", 4 pgs.

"U.S. Appl. No. 11/275,523 Non-Final Office Action mailed Jun. 6, 2007", 10 pgs.

"U.S. Appl. No. 11/275,524 non-final office action mailed May 22, 2007", 7 PGS.

"International Application No. PCT/US03/41076 International Search Report mailed Apr. 26, 2004", 6 pgs.

* cited by examiner

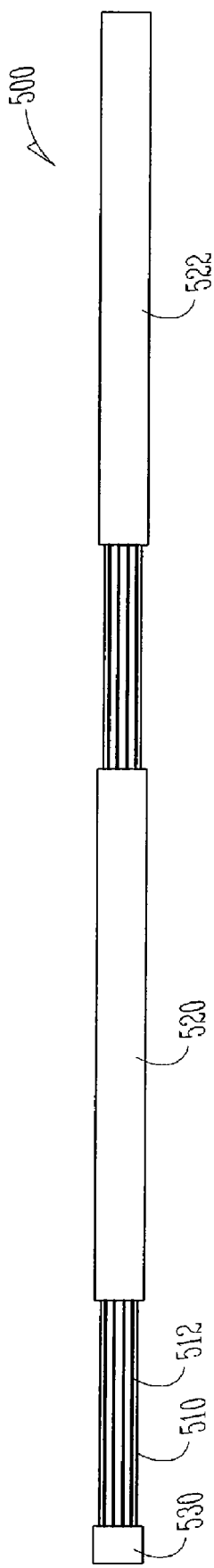
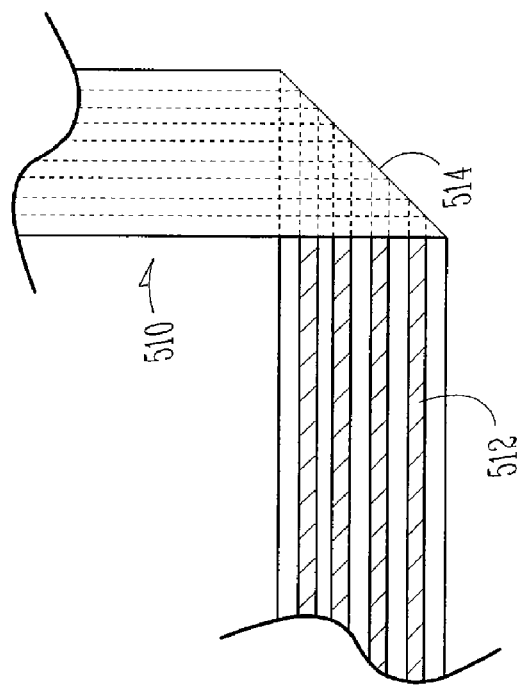
FIG. 5A
FIG. 5B

EL POWER UNIT

CROSS-REFERENCE TO RELATED APPLICATIONS

The present application is a continuation-in-part of U.S. application Ser. No. 10/707,146, filed Nov. 24, 2003, now abandoned the entire contents of which are incorporated herein; which is a Continuation-In-Part of U.S. application Ser. No. 10/328,762, filed Dec. 23, 2002, now issued as U.S. Pat. No. 6,769,138.

TECHNICAL FIELD

The present invention pertains generally to safety articles, systems and methods, and more particularly to methods and articles pertaining to illuminating human or animal subjects, particularly in situations involving poor visibility due to lighting or weather conditions.

BACKGROUND ART

The risk of injury or death in job-related traffic accidents is a principle concern to public safety and highway workers. In addition, such risks are also present for civilians who use roadways for such activities as walking, running or biking. These risks are particularly acute in poor lighting conditions as may occur at night or during inclement weather. As a result, there is a need for improvements in safety for such workers, and others engaging in outdoor activities in conditions of poor visibility. One tried and true method for reducing the chances for an unwanted accident is the use of reflective safety clothing, for example safety vests worn by highway workers and public safety workers, or reflective clothing, shoes, hats or other articles worn by civilians. Improvement of such safety related articles can yield important and precious reductions in road accidents and fatalities, and as a result are highly desirable.

DESCRIPTION OF DRAWINGS

FIG. 5A shows a view of a lamp assembly according to an embodiment of the invention.

FIG. 5B shows a detail view of a portion of a lamp assembly according to an embodiment of the invention.

DISCLOSURE

Figure 1:
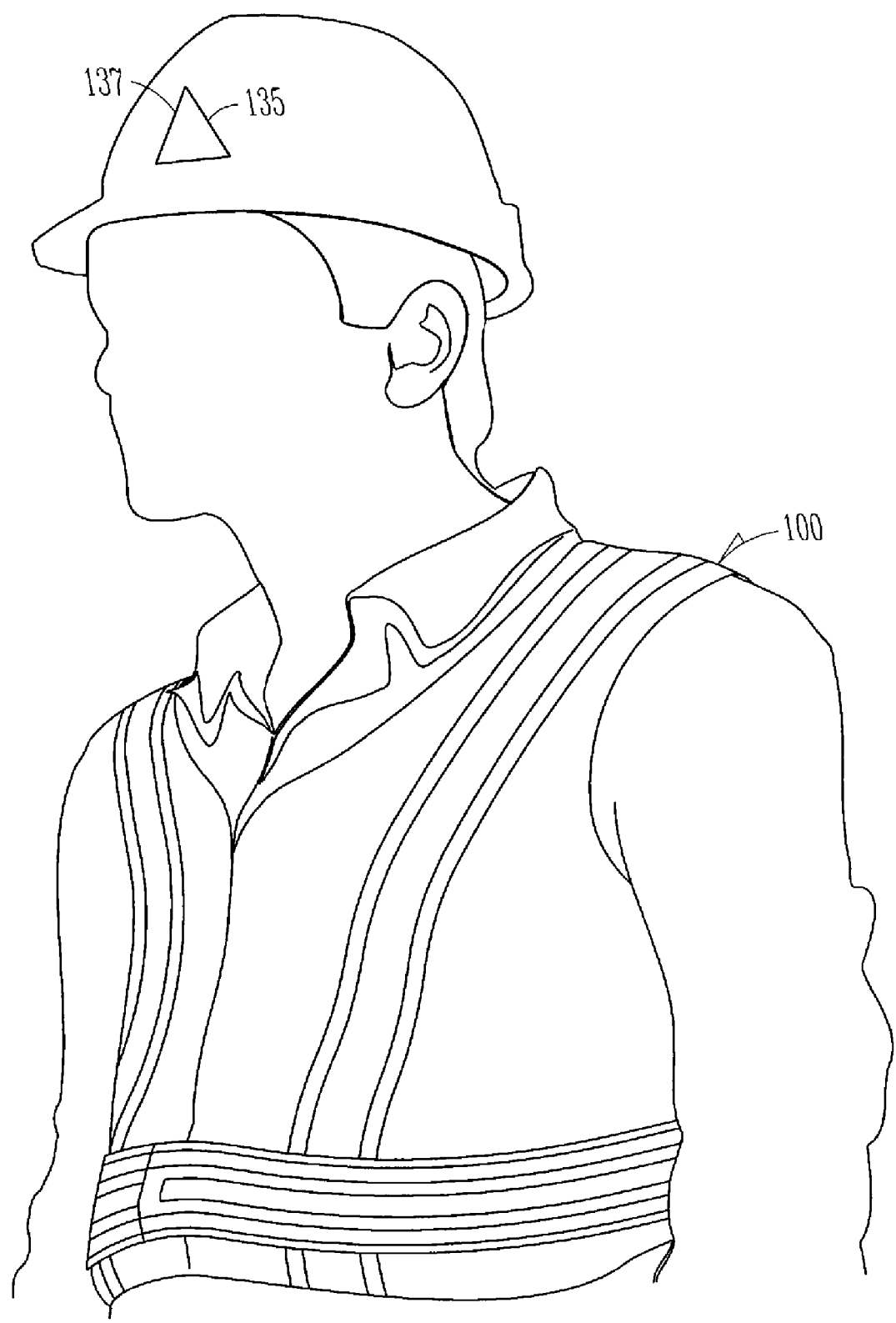
FIG. 1 shows a person wearing a safety vest and safety hat according to an embodiment of the invention.
Figure 2:
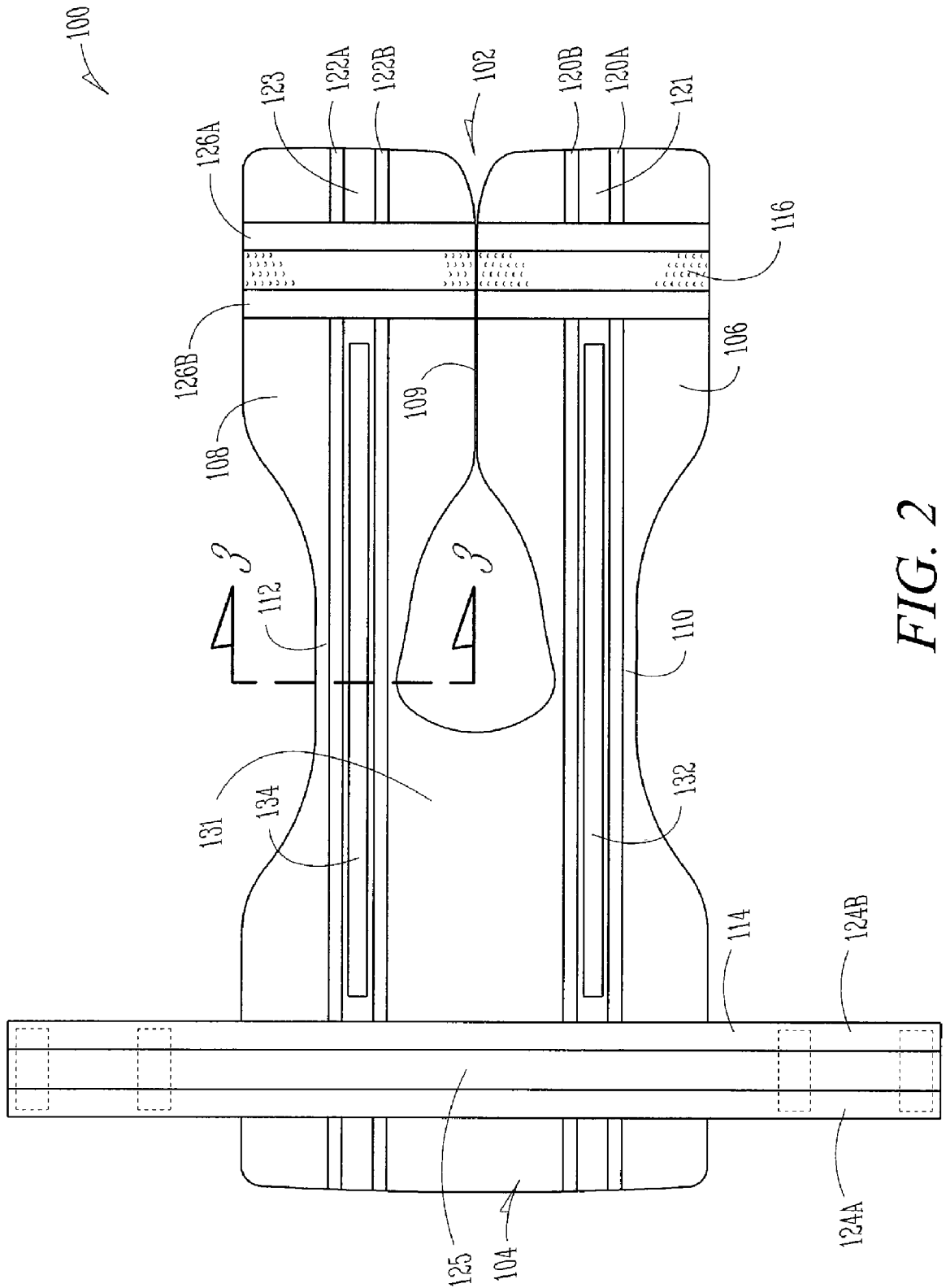
FIG. 2 shows a flat view of a vest according to an embodiment of the invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention Referring now to FIGS. 1 and 2 there is illustrated a first embodiment of a safety article of clothing according to the present invention, and in particular a safety vest 100. Vest 100 is sized to be worn by a human, as shown in FIG. 1. FIG. 2 shows the vest 100 laid out in a flat orientation to better illustrate the relationship of elements of the vest 100. FIG. 2 shows the vest 100 including a front side 102, a back side 104, a front right side 106 and a front left side 108. In one embodiment, a seam 109 is included that allows the front right side 106 to separate from the front left side 108 for ease of putting on and taking off the vest 100. In one embodiment, the interface 109 includes at least one fastening device, such as a zipper or buttons, etc. Although portions of a vest shown include a front side 102, a back side 104, a front right side 106 and a front left side 108, not all of these portions need be present within the scope of the invention. For example, in one embodiment, a vest includes a left and a right front side, and a portion going around a neck of a user.

The front and back sides 102 and 104 are connected with left and right shoulder portions 110 and 112, respectively. A waist band/belt 114 is further provided, and is adjustable so that the vest can be secured around the torso of a user. According to one example embodiment, a Velcro system 116 is used on at least one side of the vest to allow the waist band to be tightened and secured in place when worn by a user, and to be loosened and disconnected to allow the vest to be put on and taken off.

According to the embodiment of FIGS. 1 and 2, the vest 100 includes reflective stripes 120a and 120b and 122a and 122b that run respectively on the left and right sides of the vest up the front and over the shoulder portions and down the back. In addition, vest 100 includes reflective stripes 124a and 124b on the waste band that extend all the way around the back of the vest. In one embodiment, further reflective stripes 126a and 126b are included on front portions of the vest 100. Reflective stripes 120a, 120b, 122a, 122b, 124a, 124b, 126a, and 126b are all, in one embodiment a light or white colored material EL that reflects light for example from the headlights of a vehicle. In addition, in one example embodiment, these stripes are divided by a yellow colored stripe 121, 123 and 125, that provides for enhanced visibility during the day and to indicate caution to an oncoming vehicle.

In one embodiment, the reflective stripes 126a and 126b are divided by portions of Velcro system 116. Still further, the remaining portion of the vest 131 is, in one example embodiment, colored a yellow or other easily seen color. One possible alternative color for the remaining portion of the vest 131 includes safety orange. The reflective stripes are formed of any suitably reflective material such as glass bead enhanced material, reflecting polymer material, etc. The yellow, safety orange, or other color may also include a reflective material to provide further enhanced visibility of this portion of the vest in the presence of an external light source such as a headlight.

According to still another aspect of the embodiment of FIGS. 1 and 2, there is provided electroluminescent lamp (EL) strips 132 and 134 on each side of the vest extending from the front of the vest over the shoulder to the back of the vest, and in this example disposed along or on top of the colored stripes 121 and 123, respectively. In the following description, EL light elements will be referred to as EL strips. Although a strip geometry is discussed in various embodiments, several geometries such as squares, circles, arcs, tubes, cylinders, combinations thereof, etc. are possible using EL light elements.

Figure 3:
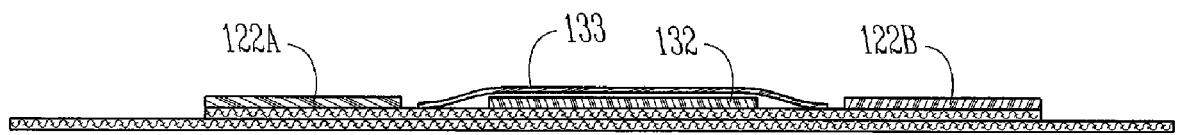
FIG. 3 shows a cross section view along line 3-3 from FIG. 2.

As shown in FIG. 3, in one embodiment, the EL lamp strips are held in place on the vest inside a protective transparent plastic sleeve 133. One embodiment of plastic sleeve 133 includes a polyurethane sleeve. According to one example embodiment, the plastic material used in the sleeve is selected so that it maintains flexibility in cold temperatures so the vest is comfortable to wear and not unduly stiff. According to one example embodiment, the EL lighting strips are provided by Durel Corporation, located at 2225 W. Chandler Blvd., Chandler, Ariz. 85224-6155. In one configuration, the EL lamp strips are sized to be approximately ½ inch wide, and vary in length depending on the clothing configuration.

Figure 4:
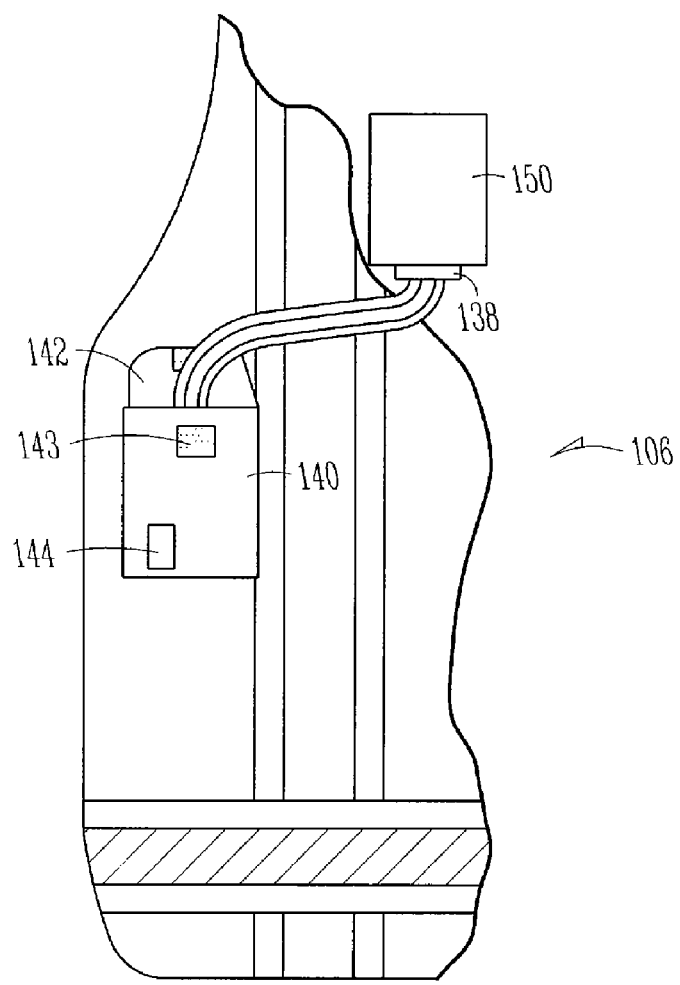
FIG. 4 shows a view of one side of a vest according to an embodiment of the invention.

As shown in FIG. 4, vest 100 includes a pocket 140. In one embodiment, the pocket 140 is located on an outside surface of the front right side 106. The pocket 140 is adapted for holding an electrical pack 150. An outside location allows the battery to be easily accessed for replacement or removal if necessary for recharging, for example using a cigarette lighter recharging device or one that operates off of line voltage such as 110 volt AC power. In one embodiment, the pocket 140 includes a closing flap 142. In one embodiment a pocket securing device, such as a Velcro portion 143 is included to secure the closing flap 142. In one embodiment, the pocket 140 includes an access opening 144. The access opening 144 allows a user to actuate a control such as a power switch on the electrical pack 140 without opening the closing flap 143. Alternative locations for the electrical pack 150 includes a pocket on the inside of the vest.

The electrical pack 150 includes a power source for powering the EL lighting strips. Examples of suitable power sources include, but are not limited to, disposable batteries, rechargeable batteries, etc. In one embodiment, the electrical pack 150 further includes control electronics such as an electrical inverter, or other electronics. In one embodiment, a power source and control electronics are located separately, and are not packaged together in the electrical pack 150. In one embodiment, the electrical pack 150 is electrically connected to strips 132 and 134 through a detachable connector 138 allowing the electrical pack 150 to be removed from the vest if desired for reasons such as recharging batteries. Suitable batteries include alkaline, nickel-cadmium, nickel-metal hydride, etc.

Figure 5C:
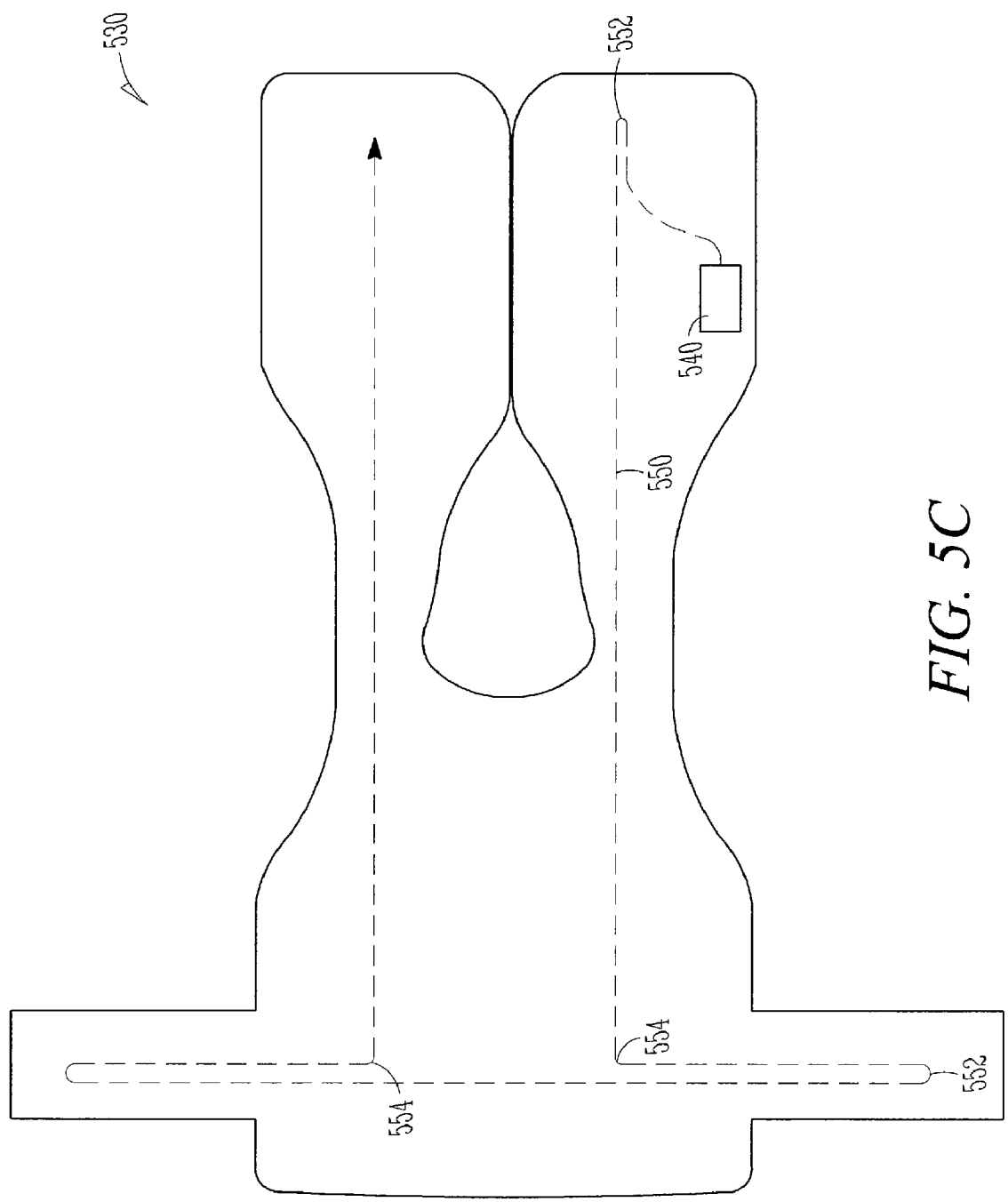
FIG. 5C shows a view of an article of safety clothing according to an embodiment of the invention.

FIG. 5A shows one example of a single strip EL assembly 500. The EL assembly 500 includes a flexible conductor portion 510, a first EL strip 520, and a second EL strip 522. Although two EL strips are shown in this example, one EL strip, or several EL strip embodiments are also contemplated within the scope of the invention. In one embodiment, the flexible conductor portion 510 includes a substantially flat flex-circuit material. A number of conductors 512 such as trace conductors on a flex circuit are included to transmit power, or electrical signals to and from the EL strips. In one embodiment, an electrical connector 530 is also included for attachment to additional circuitry or a power source, etc.

FIG. 5B shows the flexible conductor portion 510 in greater detail. One example of a fold 514 is shown for orienting selected portions of the EL assembly 500. Selected embodiments of vests and other articles of safety clothing disclosed in the present application utilize a single EL assembly 500 to illuminate multiple portions of the article of safety clothing. One advantage to the use of a single EL assembly 500 is that only a single power supply is needed to operate the article of safety clothing. This provides ease of use, and reduces manufacturing costs in production of the safety clothing.

Figure 6:
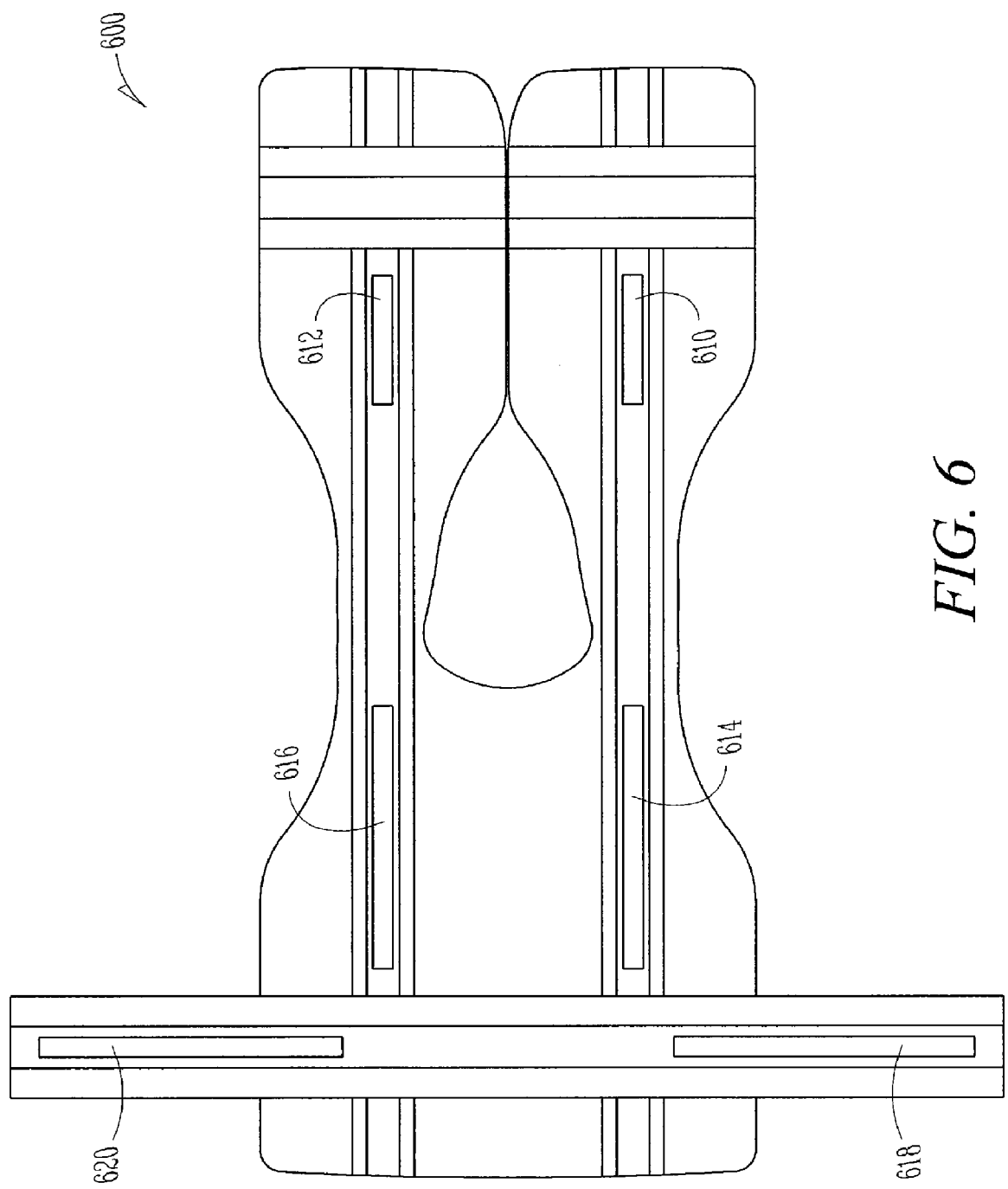
FIG. 6 shows a flat view of a vest according to an embodiment of the invention.

Referring to FIG. 6, there is illustrated yet another example embodiment of a vest 600 that is similar to that of FIGS. 1 and 2 except that EL lamp strips 610 and 612 on the front run from the bottom edge of the vest upwards approximately 4 inches. In the back, EL lamp strips 614 and 616 extend on the back of the vest from about the shoulder (but, in one embodiment, not on top of the shoulder so as to avoid light from the lamp distracting a wearer of the vest) to the bottom waist area of the vest. Further, there are provided EL strips 618 and 620 in the waist band/belt. In one embodiment, the EL strips 610-620 are held in place in polyurethane sleeves as described above.

In one example embodiment, EL strips 618 and 620 are positioned such that during normal use are provided at least a portion of EL strips 618 and 620 are visible along a side portion of the vest 600, and are situated for the purpose of providing an EL lamp that is visible to oncoming traffic when safety personnel are turned sideways to the direction of traffic. One example includes when a safety officer is facing toward the drivers window of a vehicle stopped by the side of the road.

Thus, according to the embodiment 600, "glow up" into a wearer's face is minimized such that this light does not annoy the wearer, or interfere with the wearer's ability to see forward. Also, the side profile glow provided by this embodiment enhances the visibility of the wearer when in the vulnerable position of standing sideways to oncoming traffic.

In one embodiment, the EL lamp strips are a lemon yellow color when on. Lemon yellow provides an advantageous highly visible color that is also consistent with standards set for safety vests and other such articles of clothing to maximize visibility. Various shades of yellow colors are also contemplated within the scope of the invention. Highly visible colors other than yellow, such as blaze orange, light blue, etc. are also contemplated within the scope of the invention. In one embodiment, the color of the EL lamp strips is provided by the actual discharge of the lamp elements. In one embodiment, the color of the EL lamp strips is provided, or modified by a tinted, substantially transparent cover that is placed over the EL lamp. One advantage to using a tinted cover to modify a lamp color is that both a lit and unlit color of the EL portion of the clothing can be selected. For example, an EL lamp that is blue when lit, and white when unlit can be covered with a yellow tinted cover. This will produce a green condition when lit, and the EL portion will appear yellow when unlit. This provides good visibility during the daytime, and at night with the same article of clothing.

Figure 10:
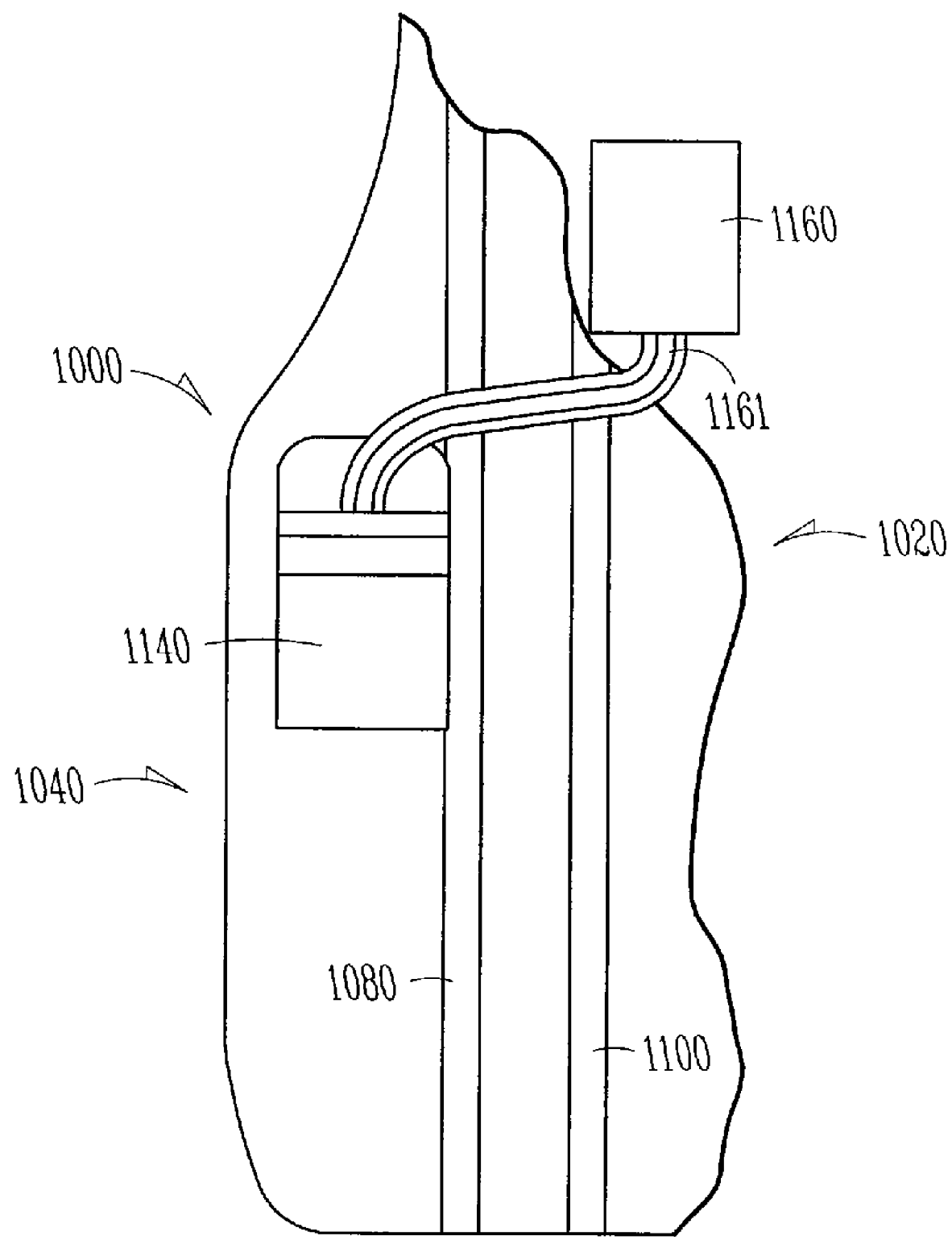
FIG. 10 is a front panel view of a life jacket embodiment of the invention, the life jacket including EL lighting.

Another embodiment, illustrated at 100 in FIG. 10, includes a life vest having EL lighting. The EL lighting enables rescuers to better find a wearer in distress. The life vest 100 includes a vest main body 102 with a front component 104 and a rear component which is not shown. Each of the front component 104 and the rear components includes designs 108 and 110 that are lit by EL lighting. The EL lighting battery (not shown) is stored in a waterproof container 116 in pocket 114. Other electrical components used in EL lighting the life vest are also waterproofed, using conventional methods. While the designs 109 and 110 are shown, it is understood that other design embodiments are suitable for use in the life vest of the invention.

Figure 7:
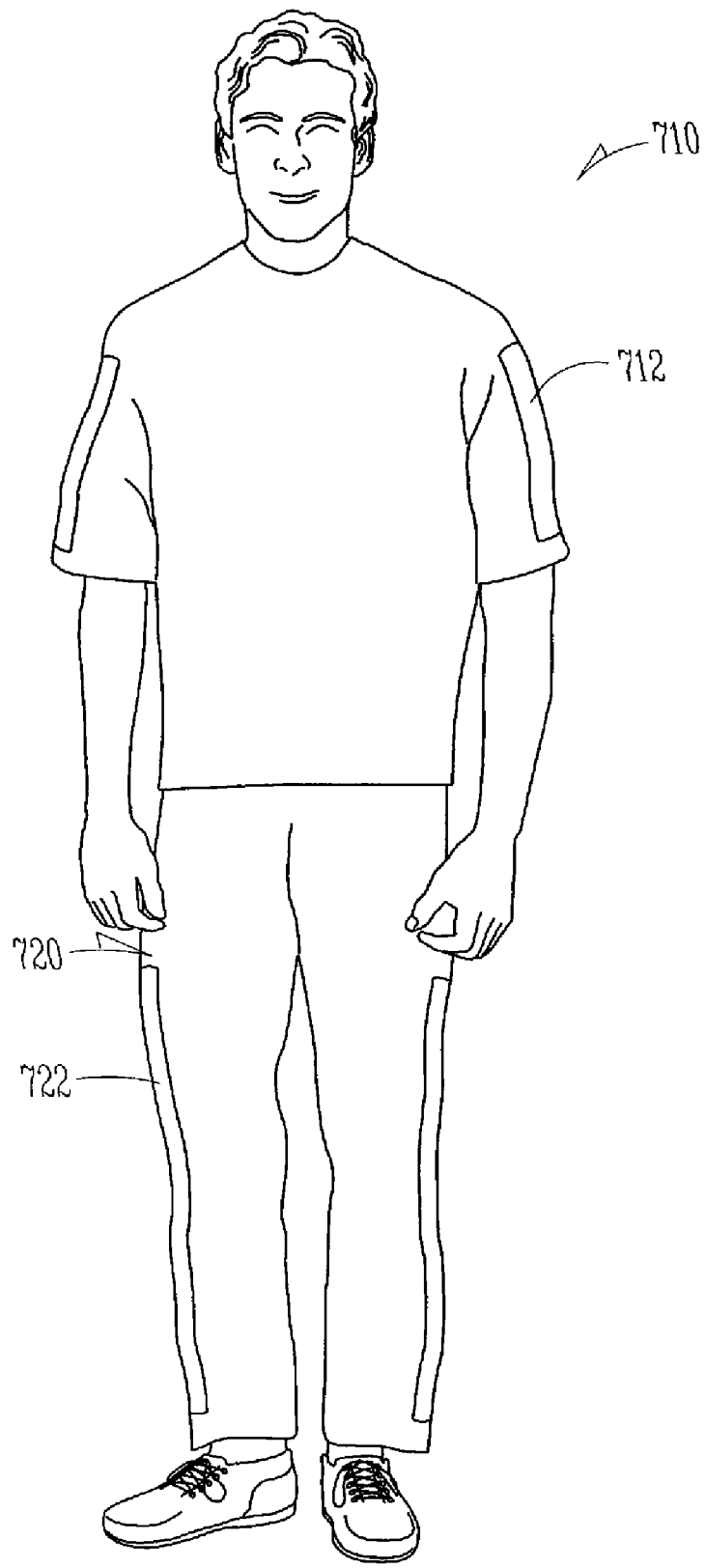
FIG. 7 shows a view of safety clothing according to an embodiment of the invention.

It shall be further realized that, according to other example embodiments, the EL lamp strips may be used as illustrated above, or in other configurations, in combination or alone with reflective materials on other articles of clothing such as jogging or walking suits or shorts, pants, shirts, sweatshirts, hats or other such articles of clothing. FIG. 7 shows a user wearing a shirt 710 with at least one EL lighting strip 712. FIG. 7 further shows the user wearing a pair of pants 720 with at least one EL lighting strip 722. Pant embodiments include but are not limited to athletic pants, pants worn as part of a uniform, safety pants, such as are worn by firemen. Furthermore, the combination of EL and reflective material may be used on safety articles worn by a user on top of or in addition to athletic or street clothing.

Figure 8:
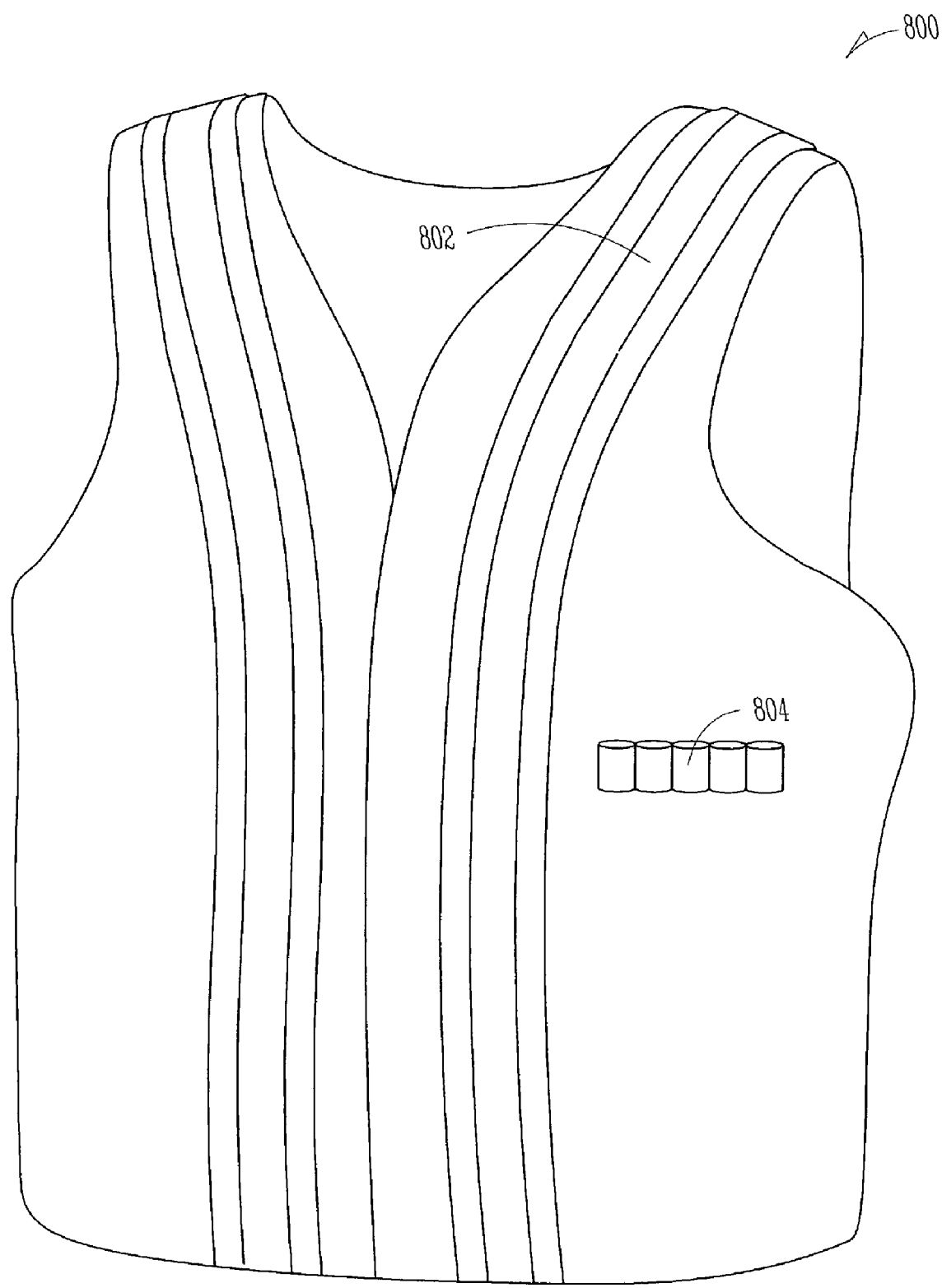
FIG. 8 shows a view of a hunting vest according to an embodiment of the invention.

According to another example embodiment shown in FIG. 8, a hunting vest 800 provides that there is one or more EL lamp strips 802 that glow orange when on. Although one configuration of EL lamp strips 802 is illustrated, other configurations are possible without departing from the scope of the invention. Further hunting accessories, such as ammunition holders 804 are included on the hunting vest 800 in one embodiment.

Figure 9A:
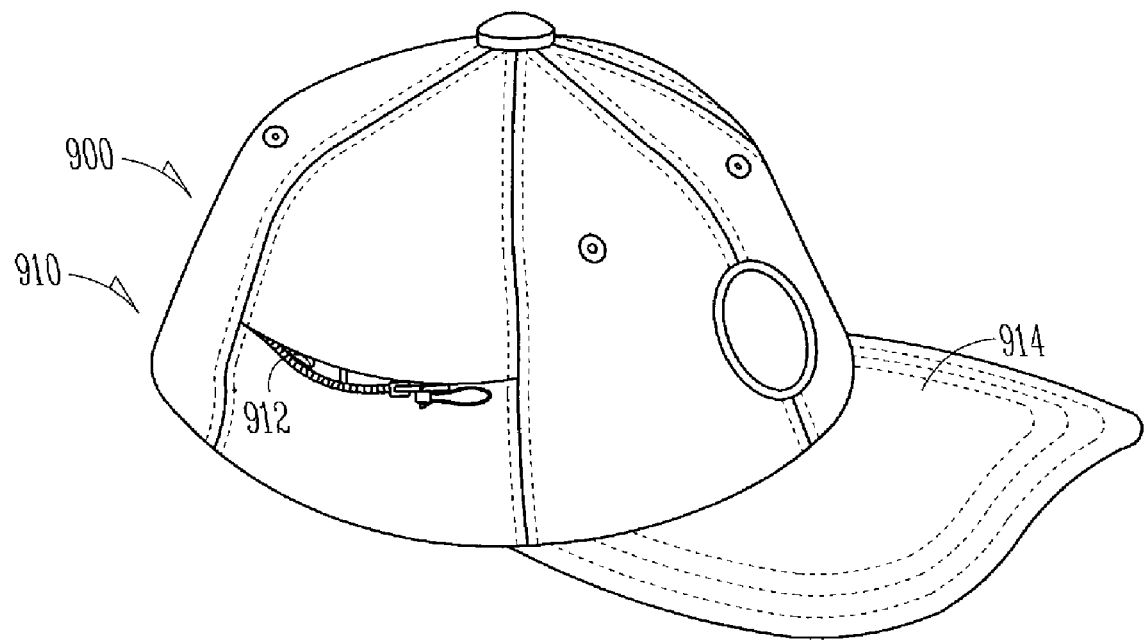
FIG. 9A is a perspective view of a hat with EL lighting.
Figure 9B:
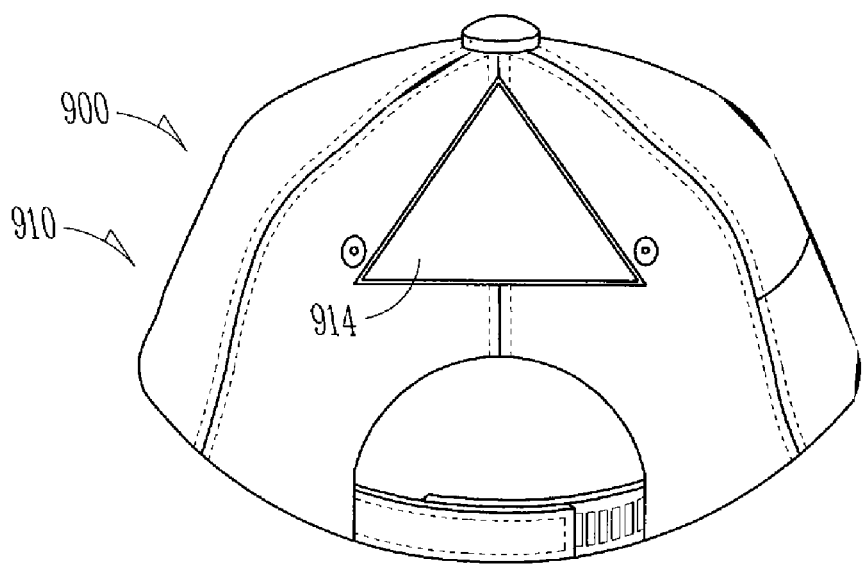
FIG. 9B is a rear view of the hat of FIG. 9A.

One hunting hat is illustrated at 900 in FIGS. 9A and 9B. The hunting hat includes a flexible main hat body 910 with EL lighting 912 illuminating a safety symbol 914, such as a triangle attached to the hat 900. The symbol is adhered with adhesive for some embodiments and is sewn onto the hat main body for other embodiments. While a triangle is shown, it is understood that other safety symbols are suitable for use on the cap 900 of the invention. Other safety symbols include a caution symbol, stop symbol and yield symbol. The flexible main hat body 910 is made of a material such as a fabric or a polymer. The hat body 910 includes a bill 914 that is stiffened. While the hat 900 is described for use in hunting, it is understood that the hat 900 has other safety uses. For instances, the hat 900 provides a safety signal for a wearer driving or sitting as a passenger in a vehicle, such as an auto, truck, four-wheeler, motor home, bus or boat.

Other hat embodiments, containing the EL lighting safety symbol include hard hats, firefighter hats, and helmets such as those worn by motorcyclists, and pilots. These hat embodiments include a rigid hat main body. One rigid hat embodiment is shown at 132 FIG. 10. These hat embodiments also include a safety symbol 137 lit by EL lighting that is adhered to the hat main body 135.

Thus, there is described above a safety vest and other articles and methods that provide for continuously illuminated EL lighting on the vest. It is known that such continuous lighting enhances the safety of the wearer and also the safety of those driving near the wearer, due to the much enhanced visibility of the vest in poor lighting conditions, particularly in inclement weather in which light sources such as headlights are not readily received or reflected back to the source due to moisture or other particles in the air such as snow, rain, steam, dust, etc. The combination of both the radiation of light from lamp strips and the reflection of light from the reflective surfaces is thus more effective than just either effect on its own, but particularly more effective than just a reflective material alone.

Life vests, collars and other accessories for pets that include EL lighting are additional embodiments of the invention. The life vests, collars and accessories include main bodies, shown at 1000 in FIG. 10, EL lighting attached to the main body, shown at 1100 and 1080 and a battery pack 1160 attached to the main body. The battery pack 1160 and wiring 1161 are waterproofed. The life vest emits a single safety color, such as orange, for one embodiment and two or more colors for other embodiments.

A detailed design of an example embodiment of a power unit, such as electrical pack 150 shown above for EL lighting assemblies or devices is set forth in Appendix A hereto, which is hereby incorporated herein and forms a part hereof.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

The invention claimed is:

1. An electrical pack to illuminate at least one electroluminescent (EL) lighting element positioned on a garment sized to be worn by a human, the electrical pack coupled to the garment, the electrical pack comprising:
   rechargeable batteries to power an EL driver circuit to illuminate the EL lighting element in an EL illumination mode of the electrical pack;
   a charging circuit coupled to the rechargeable batteries to charge the rechargeable batteries in an electrical pack charging mode;
   an input jack coupled to the charging circuit to receive electrical energy in the electrical pack charging mode and to power the charging circuit in the electrical pack charging mode to charge the rechargeable batteries; and
   a charge state indicator circuit coupled to the charging circuit and the EL driver circuit, the charge state indicator circuit associated with the electrical pack charging mode and the EL illumination mode, the charge state indicator circuit including at least one LED lamp, wherein in the electrical pack charging mode the charge state indicator circuit is adapted to illuminate the at least one LED lamp to a first color while the electrical pack is in the electrical pack charging mode, and, while the electrical pack is in the EL illumination mode, the charge state indicator circuit is adapted to illuminate the at least one LED lamp to a second color other than the first color.

2. The electrical pack according to claim 1 wherein the electrical pack includes disposable batteries disposed in the electrical pack to power the EL driver circuit to illuminate the EL lighting element.

3. The electrical pack according to claim 1, wherein the electrical pack includes a housing, and further comprising a converter circuit disposed in the housing, the converter circuit to produce an electrical signal from the batteries to power the LED.

4. The electrical pack according to claim 1, wherein the electrical pack includes a housing, and further comprising a converter circuit disposed in the housing, the converter circuit to produce an electrical signal from the batteries to power the EL lighting element.

5. The electrical pack according to claim 4, wherein the converter circuit is to power the LED.

6. An electrical pack to illuminate at least one electroluminescent (EL) lighting element positioned on a garment sized to be worn by a human, the electrical pack coupled to the garment, the electrical pack comprising:
> rechargeable batteries to power an EL driver circuit to illuminate the EL lighting element in an EL illumination mode of the electrical pack;
> a battery charging circuit coupled to the rechargeable batteries to charge the rechargeable batteries in an electrical pack charging mode;
> an input jack coupled to the charging circuit to receive electrical energy in the electrical pack charging mode and to power the charging circuit in the electrical pack charging mode; and
> a charge state indicator circuit coupled to the charging circuit and the EL driver circuit, the charge state indicator associated with the charging mode and the EL illumination mode, the charge state indicator circuit including an LED, wherein in the charging mode the charge state indicator circuit is adapted to illuminate the LED to a first color, and while the electrical pack is in the EL illumination mode, the charge state indicator circuit is adapted to illuminate a further LED to a second color other than the first color.

7. The electrical pack according to claim 6, wherein the electrical pack includes disposable batteries disposed in the electrical pack to power the EL driver circuit to illuminate the EL lighting element.

8. The electrical pack according to claim 6, wherein the electrical pack includes a housing.

9. The electrical pack according to claim 8, further comprising a converter circuit disposed in the housing, the converter circuit to produce an electrical signal from the batteries to power the LED.

10. The electrical pack according to claim 9, wherein a DC input jack is disposed through the housing and coupled to the converter circuit, the DC input jack to be connected to an energy source to charge the rechargeable batteries via the converter circuit.

11. The electrical pack according to claim 8, further comprising a converter circuit disposed in the housing, the converter circuit to produce an electrical signal from the batteries to power the EL lighting element.

12. The electrical pack according to claim 11, wherein the converter circuit is to power the LED and the further LED.

13. A power unit to illuminate at least one electroluminescent (EL) lighting element positioned on a garment sized to be worn by a human, the power unit coupled to the garment, the power unit comprising:
> rechargeable batteries;
> a converter circuit coupled to the rechargeable batteries, the converter circuit to power the EL lighting element with energy from the batteries in an EL illumination operation mode of the power unit;
> a charge state indicator circuit coupled with the converter circuit, the charge state indicator circuit associated with a power unit charging mode of the power unit and the EL illumination operation mode, the charge state indicator circuit including at least one LED lamp, wherein in the power unit charging mode the charge state indicator circuit is adapted to illuminate the at least one LED lamp to a first color, and in the EL illumination operation mode the charge state indicator circuit is adapted to illuminate the at least one LED lamp to a second color other than the first color.

14. The power unit according to claim 13 wherein the power unit includes disposable batteries disposed in the power unit to power the EL driver circuit to illuminate the EL lighting element.

15. The power unit according to claim 13, wherein the power unit includes a housing.

16. The power unit according to claim 15, wherein the converter circuit is disposed in the housing, and the converter circuit is to produce an electrical signal from the batteries to power the LED.

17. The power unit according to claim 15, wherein a DC input jack is disposed through the housing and coupled to the converter circuit, the DC input jack to be connected to an energy source to charge the rechargeable batteries via the converter circuit.

18. The electrical pack of claim 1, further comprising a battery voltage meter circuit coupled to the rechargeable batteries and to a plurality of LED lights, the battery voltage circuit to illuminate one or more of the plurality of LED lights based on a voltage of the rechargeable batteries.

19. The electrical pack of claim 6, further comprising a battery voltage meter circuit coupled to the rechargeable batteries and to a plurality of LED lights, the battery voltage circuit to illuminate one or more of the plurality of LED lights based on a voltage of the rechargeable batteries.

20. The power unit of claim 13, further comprising a battery voltage meter circuit coupled to the rechargeable batteries and to a plurality of LED lights, the battery voltage circuit to illuminate one or more of the plurality of LED lights based on a voltage of the rechargeable batteries.

* * * * *